United States Patent
Thompson et al.

(10) Patent No.: US 6,504,580 B1
(45) Date of Patent: Jan. 7, 2003

(54) NON-TELEPHONIC, NON-REMOTE CONTROLLER, WIRELESS INFORMATION PRESENTATION DEVICE WITH ADVERTISING DISPLAY

(75) Inventors: Brandt Thompson, Newport Coast, CA (US); Paul Darbee, Santa Ana, CA (US); Frank O'Donnell, Irvine, CA (US)

(73) Assignee: Evolve Products, Inc., Tustin, CA (US)

( * ) Notice: Subject to any disclaimer, the term of this patent is extended or adjusted under 35 U.S.C. 154(b) by 0 days.

(21) Appl. No.: 08/829,928

(22) Filed: Apr. 1, 1997

Related U.S. Application Data (63) Continuation-in-part of application No. 08/823,507, filed on Mar. 24, 1997, now abandoned.

(51) Int. Cl.[7] ................................................ H04N 5/44
(52) U.S. Cl. ..................... 348/734; 340/825.72; 455/90
(58) Field of Search .......................... 455/6.2, 6.3, 412, 455/5.1, 90; 340/825.22, 825.44, 825.69, 825.71, 825.72, 825.73, 825.74, 825.75, 825.76; 345/1, 2, 3, 158, 169; 348/6, 13, 734; 395/100

(56) References Cited

U.S. PATENT DOCUMENTS

| | | | |
|---|---|---|---|
| 4,287,676 A | 9/1981 | Weinhaus | 40/661.01 |
| 4,592,546 A * | 6/1986 | Fascenda et al. | 463/29 |
| 4,706,121 A * | 11/1987 | Young | 348/27 |
| 4,845,491 A * | 7/1989 | Fascenda et al. | 340/825.44 |
| 4,888,709 A | 12/1989 | Revesz et al. | 395/114 |
| 4,959,810 A | 9/1990 | Darbee et al. | 359/148 |
| 4,962,466 A | 10/1990 | Revesz et al. | 705/14 |
| 5,063,385 A * | 11/1991 | Caschera | 342/13 |
| 5,204,768 A | 4/1993 | Tsakiris et al. | 359/148 |
| 5,249,044 A | 9/1993 | Von Kohorn | 348/12 |
| 5,251,048 A * | 10/1993 | Doane et al. | 345/87 |
| 5,285,278 A | 2/1994 | Holman | 348/10 |
| 5,287,181 A | 2/1994 | Holman | 348/473 |
| 5,355,480 A | 10/1994 | Smith et al. | 345/348 |
| 5,381,991 A | 1/1995 | Stocker | 248/206.5 |
| 5,384,067 A | 1/1995 | Doane et al. | |
| 5,396,546 A * | 3/1995 | Remillard | 379/93.24 |
| 5,404,393 A | 4/1995 | Remillard | 379/93.25 |

(List continued on next page.)

FOREIGN PATENT DOCUMENTS

| | | |
|---|---|---|
| DE | 26 01 272 | 7/1977 |
| DE | 195 20 754 A1 | 12/1996 |
| FR | 2 738 931 | 3/1997 |
| WO | 9312612 | 6/1993 |
| WO | 9414283 | 6/1994 |
| WO | 9415417 | 7/1994 |
| WO | 9501056 | 1/1995 |
| WO | 9501057 | 1/1995 |
| WO | 9501058 | 1/1995 |
| WO | 9501059 | 1/1995 |
| WO | 9532583 | 11/1995 |
| WO | WO 96/30864 | 10/1996 |

*Primary Examiner*—Lee Nguyen
(74) *Attorney, Agent, or Firm*—Thomas R. Vigil; Welsh & Katz, Ltd.

(57) ABSTRACT

The annunciator includes a visual display, wireless receiving circuitry for receiving, from a host device, data including selected information to be displayed, and software and/or hardware for maintaining the selected information displayed on the visual display of the annunciator. The circuitry of the annunciator can include wireless transmitting circuitry. Further the annunciator can have mounting structure, such as a magnet for mounting the annunciator to a wall surface, such as a refrigerator door.

10 Claims, 6 Drawing Sheets

U.S. PATENT DOCUMENTS

| | | | |
|---|---|---|---|
| 5,410,326 A | * 4/1995 | Goldstein | 348/734 |
| 5,416,535 A | 5/1995 | Sato et al. | 348/706 |
| 5,418,524 A | * 5/1995 | Fennell | 340/825.22 |
| 5,436,619 A | * 7/1995 | Yun | 340/825.44 |
| 5,450,079 A | 9/1995 | Dunaway | 341/23 |
| 5,455,570 A | 10/1995 | Cook et al. | 340/825.22 |
| 5,461,667 A | 10/1995 | Remillard | 379/93.24 |
| 5,475,585 A | * 12/1995 | Bush | 705/26 |
| 5,488,423 A | 1/1996 | Walkingshaw et al. | 348/460 |
| 5,497,185 A | 3/1996 | Dufresne et al. | 348/2 |
| 5,500,681 A | 3/1996 | Jones | 348/473 |
| 5,500,691 A | * 3/1996 | Martin et al. | 348/734 |
| 5,502,504 A | 3/1996 | Marshall et al. | 348/565 |
| 5,504,475 A | 4/1996 | Houdou et al. | 340/825.35 |
| 5,507,464 A | * 4/1996 | Hamerski | 248/683 |
| 5,510,828 A | * 4/1996 | Lutterbach et al. | 348/13 |
| 5,523,794 A | 6/1996 | Mankovitz et al. | 348/460 |
| 5,532,689 A | 7/1996 | Bueno | 340/928 |
| 5,537,107 A | 7/1996 | Funado | 340/825.72 |
| 5,537,463 A | 7/1996 | Escobosa et al. | 379/102.01 |
| 5,539,393 A | 7/1996 | Barford | 340/825.52 |
| 5,539,479 A | 7/1996 | Bertram | 348/564 |
| 5,546,316 A | 8/1996 | Buckley et al. | 364/479.03 |
| 5,552,837 A | 9/1996 | Mankovitz | 348/734 |
| 5,566,353 A | 10/1996 | Cho et al. | 455/2 |
| 5,576,768 A | 11/1996 | Gomikawa | 348/468 |
| 5,579,535 A | * 11/1996 | Orlen et al. | 455/421 |
| 5,583,491 A | * 12/1996 | Kim | 340/825.72 |
| 5,583,560 A | 12/1996 | Florin et al. | 348/7 |
| 5,594,509 A | * 1/1997 | Florin et al. | 348/731 |
| 5,602,597 A | * 2/1997 | Bertram | 348/565 |
| 5,603,078 A | * 2/1997 | Henderson et al. | 455/5.1 |
| 5,604,616 A | 2/1997 | Dunn et al. | |
| 5,604,923 A | 2/1997 | Wilkus | 455/67.7 |
| 5,646,606 A | * 7/1997 | Wilson et al. | 340/825.37 |
| 5,646,608 A | * 7/1997 | Shintani | 340/825.52 |
| 5,663,757 A | 9/1997 | Morales | 348/13 |
| 5,684,526 A | * 11/1997 | Yoshinobu | 348/13 |
| 5,691,795 A | 11/1997 | Doane et al. | |
| 5,695,400 A | * 12/1997 | Fennell, Jr. et al. | 463/42 |
| 5,721,597 A | 2/1998 | Kakinuma et al. | |
| 5,726,636 A | * 3/1998 | Hayes, Jr. | 340/636 |
| 5,729,219 A | * 3/1998 | Armstrong et al. | 341/20 |
| 5,737,028 A | * 4/1998 | Bertram et al. | 348/563 |
| 5,767,896 A | 6/1998 | Nemirofsky | 348/13 |
| 5,774,172 A | 6/1998 | Kapell et al. | 348/13 |
| 5,796,832 A | * 8/1998 | Kawan | 380/24 |
| 5,847,798 A | 12/1998 | Yang et al. | |
| 5,850,340 A | * 12/1998 | York | 364/188 |
| 5,870,030 A | * 2/1999 | DeLuca et al. | 340/825.44 |
| 5,870,155 A | * 2/1999 | Erlin | 348/734 |
| 5,870,683 A | * 2/1999 | Wells et al. | 455/566 |
| 5,877,755 A | * 3/1999 | Hellhake | 345/327 |
| 5,887,254 A | * 3/1999 | Halnonen | 455/419 |
| 6,067,570 A | * 5/2000 | Kreynin et al. | 709/227 |

* cited by examiner

NON-TELEPHONIC, NON-REMOTE CONTROLLER, WIRELESS INFORMATION PRESENTATION DEVICE WITH ADVERTISING DISPLAY

CROSS REFERENCE TO RELATED APPLICATIONS

This application is a continuation-in-part of U.S. Ser. No. 08/823,507, filed Mar. 24, 1997 and entitled TWO-WAY REMOTE CONTROL WITH ADVERTISING DISPLAY, now abandoned.

BACKGROUND OF THE INVENTION

1. Field of the Invention

The present invention relates to a non-telephonic information presentation device or annunciator display device which is always on and which can wirelessly receive information to be displayed. Electronic information coming into the home can be displayed on a TV, or in some cases, a PC. When these devices are turned off, no information is displayed. However, the source of information is often still present, in the form of broadcast signals or cable TV signals which can be picked up by the annunciator of the present invention.

2. Description of the Related Art Including Information Disclosed Under 37 CFR §§1.97–1.99

Heretofore, various systems have been proposed for the remote display of information, such as the display of prices on the edge of a shelf in a supermarket or information on the screen of a television set. Also, there have been proposed remote control devices with a visual display for displaying information and including credit card and smart card readers and built in modems or adapters for communicating with a modem. Several examples of such previously proposed remote control devices and remote display systems are disclosed in the following U.S. Patents:

| U.S. Pat. No. | Patentee |
| --- | --- |
| 4,888,709 | Revesz et al. |
| 4,962,466 | Revesz et al. |
| 5,204,768 | Tsakiris et al. |
| 5,249,044 | Von Kohorn |
| 5,285,278 | Holman |
| 5,287,181 | Holman |
| 5,355,480 | Smith et al. |
| 5,396,546 | Remillard |
| 5,404,393 | Remillard |
| 5,410,326 | Goldstein |
| 5,416,535 | Sato et al. |
| 5,450,079 | Dunaway |
| 5,455,570 | Cook et al. |
| 5,461,667 | Remillard |
| 5,488,423 | Walkingshaw et al. |
| 5,497,185 | Dufresne et al. |
| 5,500,681 | Jones |
| 5,502,504 | Marshall et al. |
| 5,504,475 | Houdou et al. |
| 5,523,794 | Mankovitz et al. |
| 5,532,689 | Bueno |
| 5,537,107 | Furnado |
| 5,537,463 | Escobosa et al. |
| 5,539,393 | Barfod |
| 5,539,479 | Bertram |
| 5,546,316 | Buckley et al. |
| 5,552,837 | Mankovitz |
| 5,566,353 | Cho et al. |
| 5,583,560 | Florin et al. |
| 5,594,509 | Florin et al. |
| 5,603,078 | Henderson et al. |
| 5,576,768 | Gomikawa |
| 5,604,923 | Wilkus |

| PCT Patent Publication | Applicant |
| --- | --- |
| WO 93/12612 | Yuen at al. |
| WO 93/19427 | Singer st al. |
| WO 94/15417 | Minimetrics Limited |
| WO 95/32583 | TV Guide On Screen |
| WO 95/01056 | Apple Computer, Inc. |
| WO 95/01057 | Apple Computer, Inc. |
| WO 95/01058 | Apple Computer, Inc. |
| WO 95/01059 | Apple Computer, Inc. |

The Tsakiris et al. U.S. Pat. No. 5,204,768 discloses a remote controlled electronic presentation system including a wireless remote control which includes an infrared receiver and an infrared transmitter for communicating with a remote transceiver coupled to a computer.

The Smith et al. U.S. Pat. No. 5,355,480 discloses an interactive terminal which is coupled via two-way RF communication to a central location designated as the system manager. A key pad which may be directly coupled via an infrared remote control transmission link receiver is actuated to cause a prompting screen to be displayed on a television set.

The Remillard U.S. Pat. Nos. 5,396,546, 5,404,393 and 5,461,667 are directed to an electronic device and method for accessing remote electronic facilities and displaying information retrieved from the remote electronic facility on a conventional television set including a host computer connected to a television set and to a telephone line. An electronic device interface is coupled between the television set and the host computer and facilitates display of retrieved data on the television set under the operation of a remote key pad control having keys for initiating the sending of menu selection signals to the electronic device interface.

The Goldstein U.S. Pat. No. 5,410,326 discloses a programmable remote control device for interacting with a plurality of remotely controlled devices, including an optical input, an IR input and an audio input for transferring embedded data in a television broadcast to the remote control device. The remote control has an FM bi-directional communication link to a telephone interface which can be radio frequency coupled to a television set or to a telephone line or a power line. The remote control has a visual display and advertising can be displayed on the visual display.

The Dunaway U.S. Pat. No. 5,450,079 discloses a multimodal hand-held remote control device including an IR transmitter and an IR or optical receiver and/or RS 232 interface for transmitting data to and receiving data from a controlled multimedia or host.

The Cook et al. U.S. Pat. No. 5,455,550 discloses a method and apparatus for communication of program data via a remote control unit including a remote control having an RF receiver and an RF transmitter for communicating with a digital music tuner.

The Marshall et al. U.S. Pat. No. 5,502,504 discloses a video mix program guide stored in a computer and having an infrared radio frequency receiver. A viewer sends commands to the receiver to control operation of the computer by use of an infrared or radio frequency remote control transmitter.

The Apple Computer, Inc. PCT Patent Publication Nos. WO 95/01057, WO 95/01056, WO 95/01058 and WO 95/01059 disclose an interactive audio-visual (AV) transceiver coupled to a television set and/or a telephone cable. A remote control device is provided for communication with the AV transceiver to interactively manage selection of program and service sources. The remote control device sends and receives wireless (IR) control signals to and from an IR control unit and the audio-visual transceiver.

The Minimetrics Limited PCT Patent Publication No. WO 94/15417 discloses a combined remote control and data logging unit for use as a market research tool and includes a transceiver comprising an infrared input and an infrared output.

Also, devices for releasably mounting an article to a planar surface, such as a wall, have been proposed. See for example U.S. Pat. No. 4,287,676 to Weinhaus.

SUMMARY OF THE INVENTION

According to the present invention there is provided a low-cost annunciator display device, or simply annunciator, capable of wirelessly (via IR or RF) receiving information to be displayed. The advantage is that, in contrast to a television or a PC, the display on the annunciator can always be on. The annunciator can act as a billboard, touting pay-per-view events, products, services, coupon offers or any other advertising, as well as carrying information such as sports, news, finance, traffic, TV guide, gaming, shopping, and features. With the added ability to wirelessly send information to a host device, interactive or transactional applications are possible.

The advertising message on the annunciator is an information payload, in the sense that an advertiser can be charged for time on the annunciator's screen.

When the annunciator is used in conjunction with interactive applications running on a settop box, the TV itself, or a computer, it is important that the interactive advertising offers appear during commercial program breaks and not extend into the program proper. In this case, the annunciator can extend the time available to the user to respond to interactive offers by "trailing" the offer to the annunciator's screen after the interactive ad has disappeared from the TV (or PC) screen and regular programming has resumed.

Many systems which deliver information are two-way, meaning that information originating from the user can be read by or delivered to a central "head end." Such systems can allow transactions by the user, such as responses to advertising offers, merely by pressing a button on the annunciator, thus bypassing the TV or PC as a display device.

In the case where the delivery medium for advertising to the annunciator is not two-way, "bypass" structure can be provided for return signals to a central computer. For instance, a low-cost radio transmitter in the annunciator can send data to an autodialer modem connected to the telephone line. User responses to advertising offers can then be sent by telephone to a central computer.

Cable, satellite, or broadcast TV are the normal means for transporting information to the annunciator, using receiving circuitry in the settop box or the TV itself, along with an IR or RF wireless link to the annunciator. However, bypass of the cable, satellite, or broadcast TV downstream link to the annunciator is also possible, using a paging network, FM SCA data on a radio station, a modem with a wireless link to the annunciator, or a wireless link to a computer which is in turn connected to a remote network such as the Internet.

The fact that the display on the annunciator can always be active and readable, whether or not the TV or PC are turned on, is an important extension of the exposure of the user to advertising offers.

To accommodate the narrow bandwidth usually available on the wireless link between the sending device and the annunciator, images can be compressed before being sent to the annunciator. Either the bitmapped images can be compressed using any one of several well-known compression algorithms, such as JPEG, or drawing commands can be sent to a GDI (graphics device interface) running in the annunciator.

By allowing the annunciator to receive executable code as well as static images, the annunciator can display animated graphics, run interactive sessions with the user, or upgrade its own software to enhance its usefulness.

Thus, according to the present invention there is provided an annunciator including a visual display, wireless receiving circuitry for receiving, from a host device, data including selected information to be displayed, and software and/or hardware for maintaining the selected information displayed on the visual display of the annunciator.

DESCRIPTION OF THE PREFERRED EMBODIMENT(S)

Figure 1:
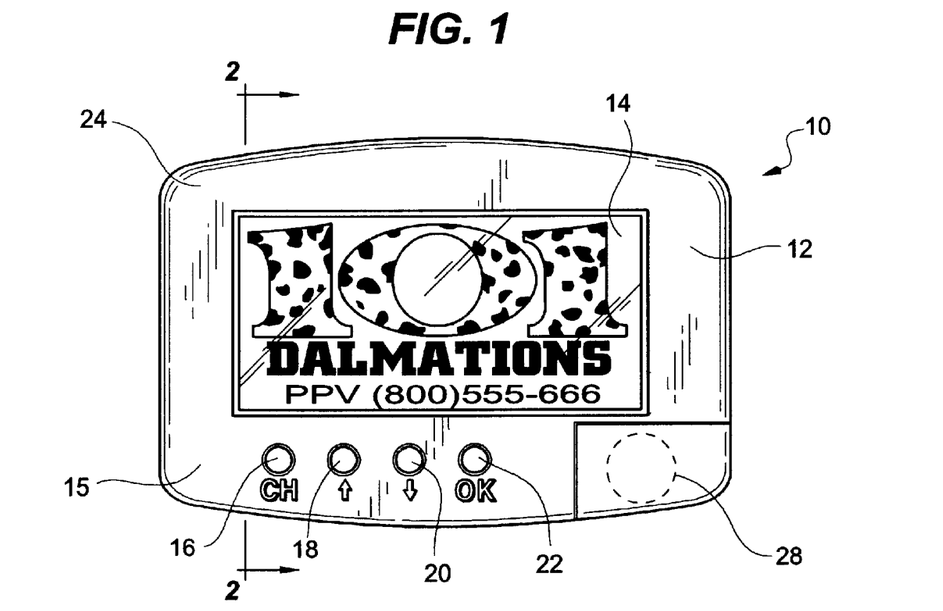
FIG. 1 is a plan view of a wall mountable annunciator display device constructed according to the teachings of the present invention.

Referring now to FIG. 1 in greater detail, there is illustrated therein an annunciator 10 constructed according to the teachings of the present invention. The annunciator 10 includes, on a top panel 12 thereof, an LCD visual display 14, and a keyboard 15 comprising a CH (channel) key 16, an ARROW UP key 18, an ARROW DN key 20, and an OK/SEND key 22.

It is to be noted that more or fewer buttons or keys can be provided on the keyboard 15. However, experience has shown that the fewer buttons or keys the better, making the annunciator 10 simpler to operate. One key that could be added is an ON/OFF key.

Figure 2:
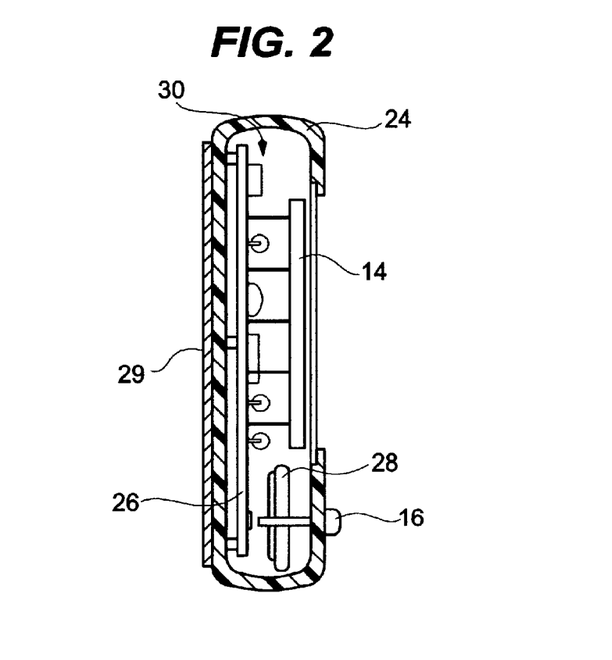
FIG. 2 is a sectional view through the wall mountable annunciator display device of FIG. 1.

FIG. 2 is a sectional view through a housing 24 of the annunciator 10 shown in FIG. 1 and shows that the annunciator housing 24 includes an open area for receiving a circuit board 26 and a flat battery 28. The visual display screen 14 can be touch sensitive, if desired, and is connected as shown to the circuit board 26.

Although a generally rectangular housing 24 is shown in FIG. 1, it is to be understood that the annunciator can have any shape desired, such as, for example, a circular shape so that the annunciator can look like and serve as a beverage coaster.

An important feature of the annunciator of the present invention is the provision of mounting structure 29 on the back or underside of the housing 24. In the illustrated embodiment, the mounting structure is a magnet, much like a "refrigerator magnet".

It will be understood, however that other mounting structures 29 can be used, such as:

- a suction cup for attaching the annunciator 10 to an impervious surface;
- an adhesive for attaching the annunciator 10 to a surface; hook and loop material of the type sold under the trademark VELCRO fixed to a surface of the annunciator 10 and mating hook and loop material fixed to a surface on which the annunciator 10 is to be mounted;
- a pin for attaching the annunciator 10 to a suitable material such as clothing; and,
- a chain, a string, a ribbon, a cord or other flexible structure for attaching or hanging the annunciator 10 to or from another object or a person.

The annunciator 10 can have, alternatively, other structure for supporting the annunciator 10 on a generally horizontal surface with the visual display 14 facing laterally, much like a picture in a stand up picture frame, eg a fold out structure.

Figure 3:
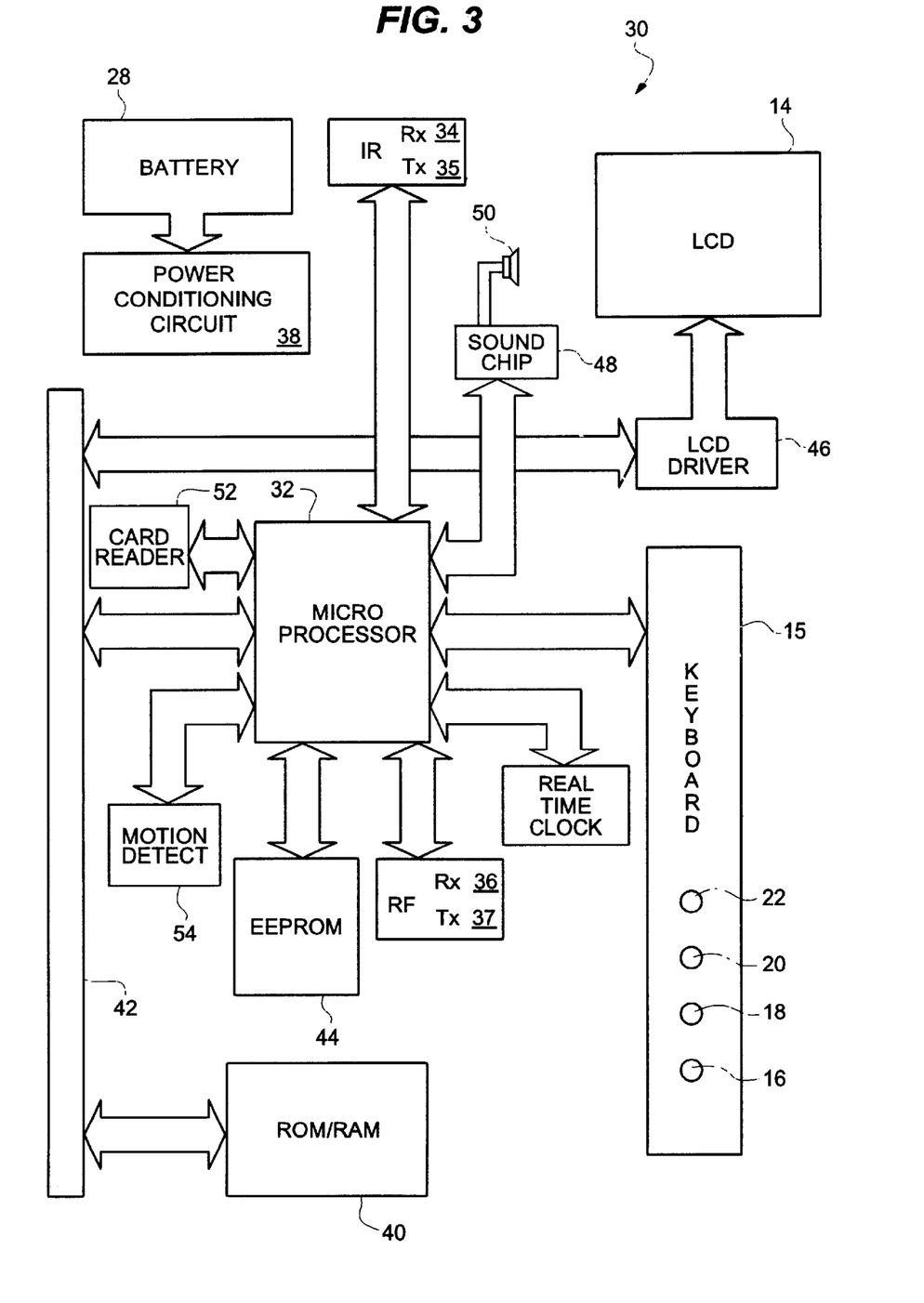
FIG. 3 is a block circuit diagram of the circuitry in the wall mountable annunciator display device shown in FIG. 1.

Referring now to FIG. 3, circuitry 30 for the annunciator 10 that is mounted on the circuit board 26 in the housing 24 includes a microprocessor 32 connected to the keyboard 15, to an IR receiver 34 and, if desired, to an IR transmitter 35 and/or to an RF receiver 36 and, if desired, to an RF transmitter 37. The battery 28 is connected to a power conditioning circuit 38 coupled to the various components needing power. A ROM/RAM 40 is coupled to a bus 42 connected to the microprocessor 32.

If desired, an EEPROM 44 also can be coupled to the microprocessor 32. An LCD driver circuit 46 is coupled between the bus 42 and the LCD visual display 14.

If desired, a sound synthesizing chip 48 can be coupled to the microprocessor 32 and to a speaker 50.

Another modification is to provide a card reader device 52 coupled to the microprocessor for reading a credit card and/or smart card.

Further, if desired, a motion detect circuit 54 can be coupled to the microprocessor 32, as shown.

In the operation of the annunciator 10, a signal is received either by the IR receiver 34 or the RF receiver 36 and such signal contains selected information, typically including an advertisement. This advertisement is placed on the visual display 14 by the software and hardware in the annunciator 10 and is maintained on the display 14 unless a user of the annunciator 10 presses a key to obtain a display of other information or to send information.

Figure 4:
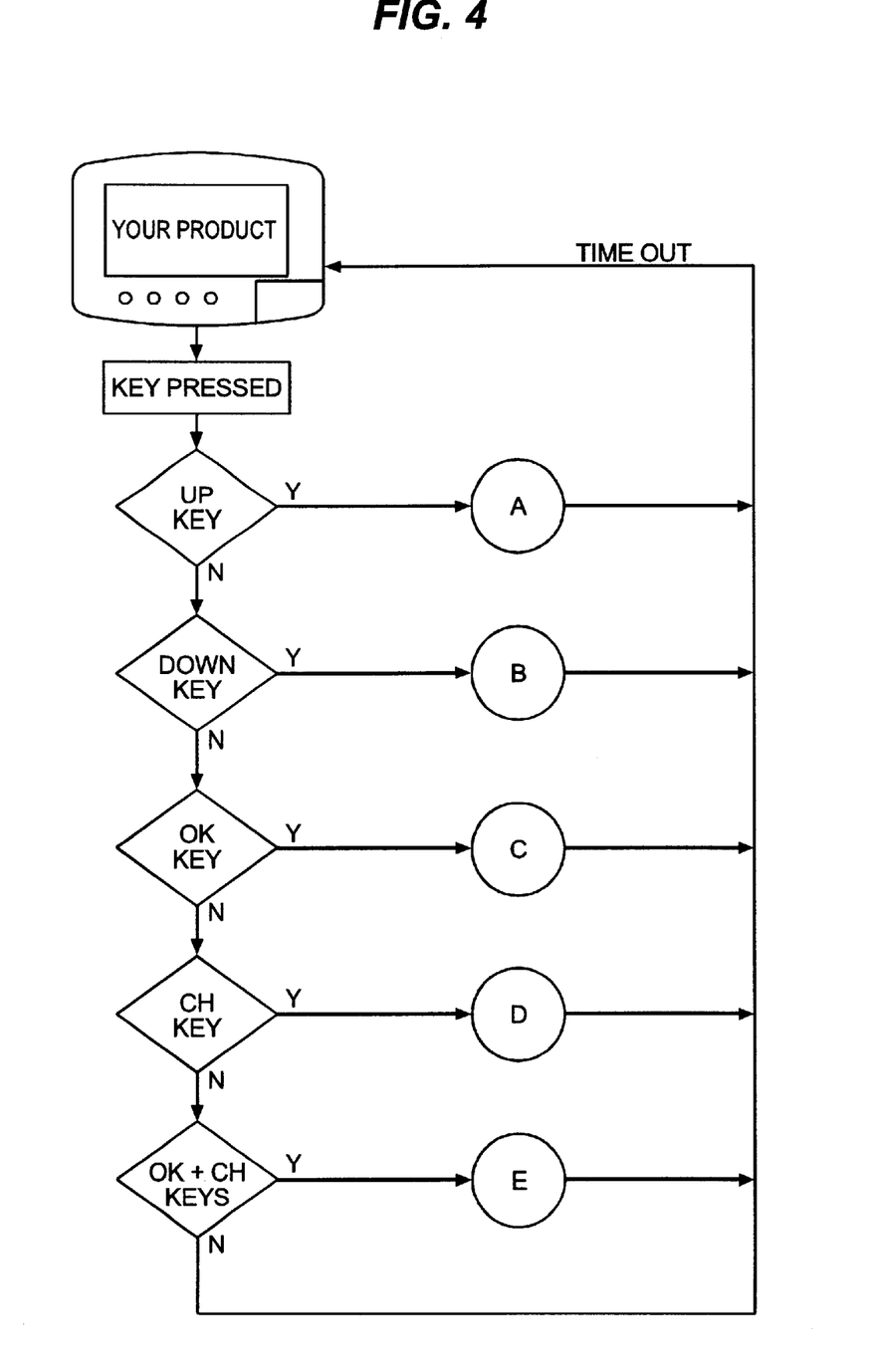
FIG. 4 is a flow chart of the operations performed when one of the keys on the annunciator device is pressed.
Figure 5:
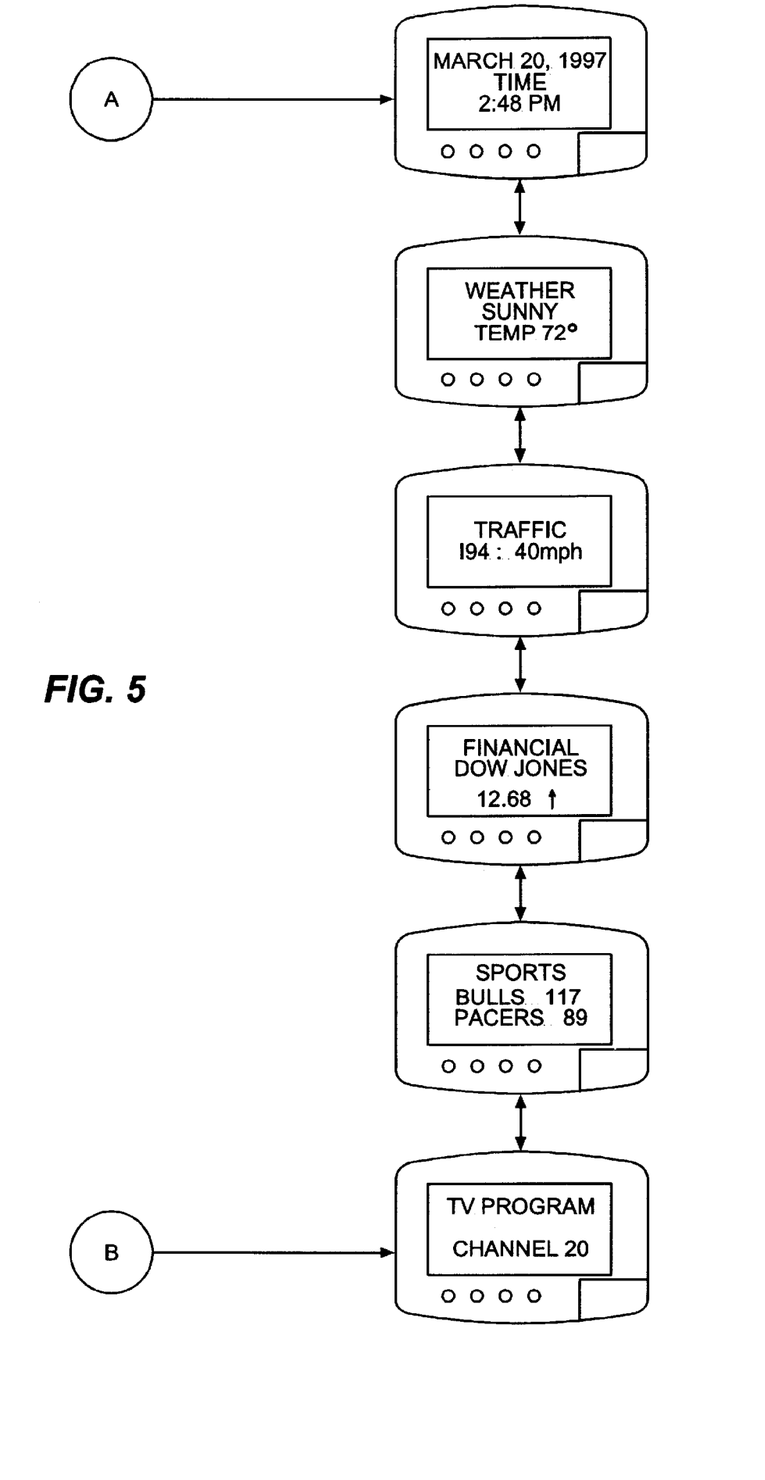
FIG. 5 is a flow chart of the displays that are shown on the visual display when either the ARROW UP key is pressed or the ARROW DN key is pressed.

Referring now to FIG. 4, which is a flow chart of the basic operating routine for the annunciator 10, it will be noted that, once a key is depressed, a determination is made if it is an ARROW UP key 18, in which case the program in the ROM/RAM 40 or EEPROM 44 goes to subroutine A shown in FIG. 5. If the key was the ARROW DN key 20, then the program goes to subroutine B, which is the other end of the routine shown in FIG. 5.

Figure 6:
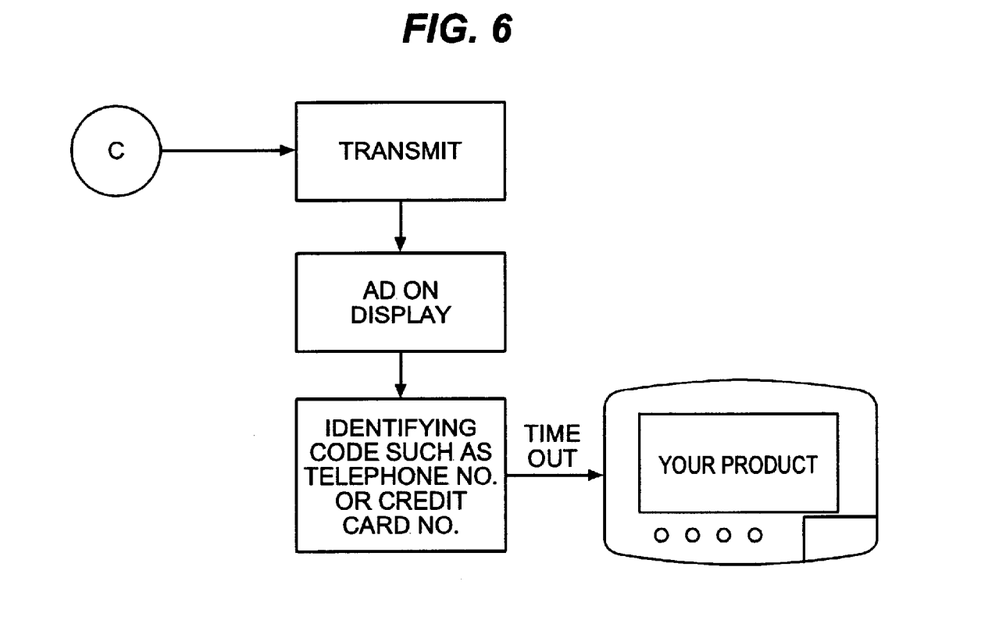
FIG. 6 is a flow chart of the steps that are performed and the displays that appear on the visual display when the OK key is pressed.

If the key was the OK key 22, then the program goes to subroutine C shown in FIG. 6.

Figure 7:
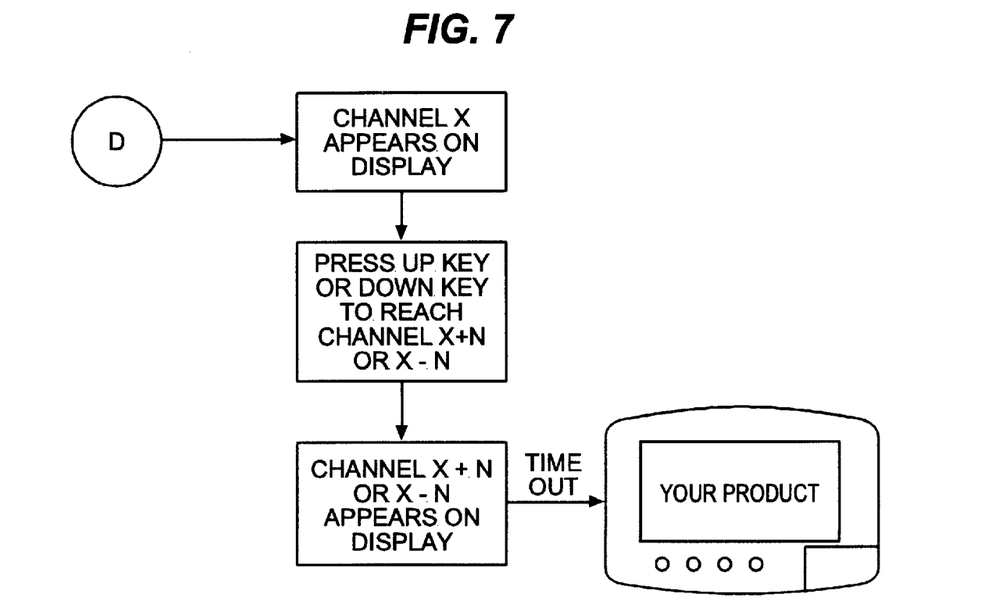
FIG. 7 is a flow chart of the steps that are performed to set the display device for showing the programming on a specific channel by pressing the CH key and one of the ARROW keys until the selected channel appears on the display.

If the key pressed was the CH (channel) key, then the program goes to subroutine D shown in FIG. 7.

Figure 8:
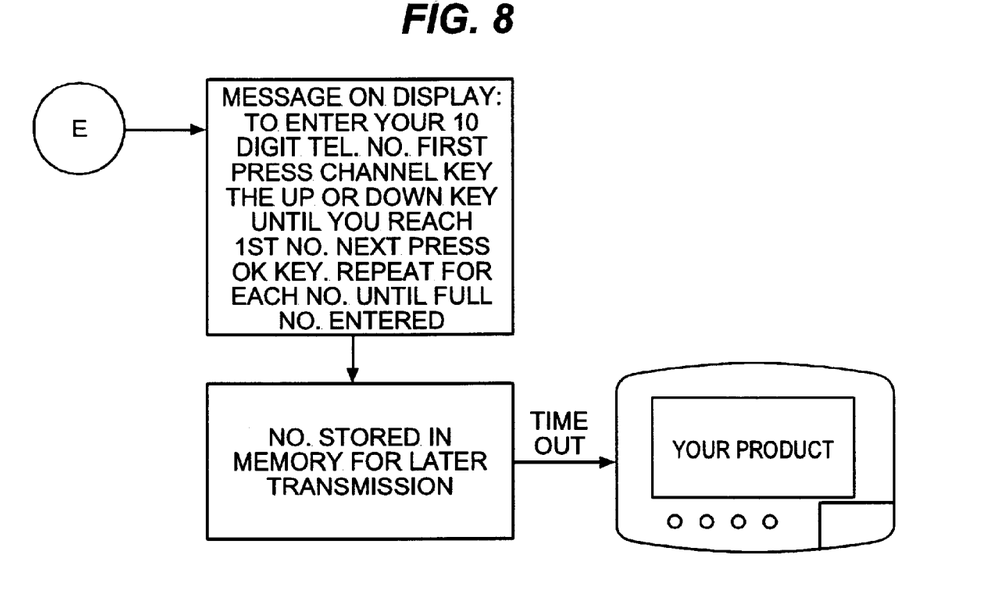
FIG. 8 is a flow chart of the routine that is followed by depressing the CH key and the OK key at the same time in order to enter a code number such as a telephone number or credit card number.

Finally, if two keys are pressed simultaneously, the OK key 22 and the CH key 16, then the program goes to subroutine E shown in FIG. 8.

As shown in FIG. 5, when the ARROW UP key 18, or the ARROW DN key 20 is pressed, the annunciator 10 will cycle through a series of different information displays. This cycling can be automatic or can be caused by repeated key presses of the ARROW UP key 18 or the ARROW DN key 20.

Figure 9:
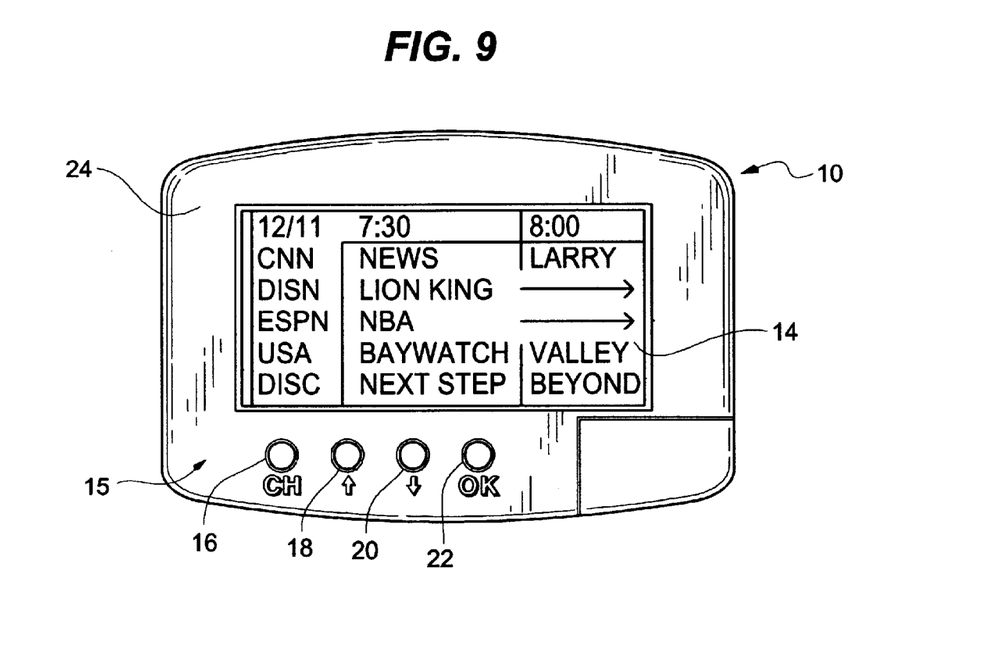
FIG. 9 is a plan view of a display on the visual display of television programming for a one half hour period.

Typically, as shown, the first press of the ARROW UP key 18 will cause a display of the date and time. Then, the next display will be of weather and temperature. The succeeding display is of traffic conditions. Next, a financial report is displayed, followed by a sports score report and finally a TV programming display for a particular channel or time period as shown in FIG. 9. Of course, other information, such as a game, can be displayed on the visual display 14.

If the OK key 22 is pressed, then the program goes into subroutine C shown in FIG. 6. Assuming that an identifying code is present or has been programmed into the annunciator 10, such code is now transmitted. The code can be a telephone number or a credit card number.

As shown in FIG. 6, pressing of the OK key 22 causes the annunciator 10 to transmit two signals containing certain information, namely the advertisement on the visual display 14 and the identifying code of the user. After these two signals are sent, there is a time out period of a few seconds to few minutes, after which the program returns the advertisement to the visual display 14.

If the CH key 16 is pressed after a user has gone to the TV programming position in the subroutine shown in FIG. 5, a channel number will first appear on the display., Then, if the user wishes to change the channel number, he or she will press the ARROW UP key 18or the ARROW DN key 20 reach channel X+N or X−N. Once the desired channel is reached, the channel number will appear on the display for a time out period of a few seconds to a few minutes and then will return to a display of the advertisement.

Alternatively, the annunciator 10 can be programmed to display the programming on a number or all the channels over a short time period, e.g., one half hour, as shown in FIG. 9. Here, the annunciator 10 will scroll through the programming for the next one half hour period.

If the annunciator 10 does not come programmed with an identifying code, such as a telephone number or a credit card number, and the annunciator 10 is configured to transmit a telephone number as an identifying number for the purchaser, the program will go to subroutine E shown in FIG. 8. Then, when the CH key 16 and the OK key 22 are pressed at the same time, a message will appear on the visual display 14 explaining how to enter the user's telephone number. In this respect, a message will be displayed saying:

"To enter your 10 digit tel. no. first press CH key. Then press ARROW UP key or ARROW DN key. Next press the OK key. Repeat the above steps for each no. until all 10 numbers are entered."

After all 10 numbers are entered, they are stored in the RAM/ROM 40 of the circuit 30, shown in FIG. 2. Next, after a time out period of a few seconds to a few minutes, the display screen 14 will return to the display of the advertisement.

According to the teachings of the present invention, the annunciator 10 is programmed so that an advertisement is displayed on the screen 14 when the annunciator 10 is not being used or is otherwise in a quiescent state.

It is to be understood that an important feature of the present invention is the "restore screen after timeout sequence" which is shown at the end of each of the subroutines in FIGS. 5–8.

If the batteries are low, a subroutine can be provided to cause the annunciator to go through a "low battery sequence" which "pops up" a low battery message for three seconds.

The annunciator 10 can be constructed, arranged and programmed to have or provide a number of features. For example, the software can maintain a display of selected information on the visual display even when the annunciator 10 is in a quiescent state or turned off.

It will be understood that the host device with which the annunciator 10 communicates, either by IR (34, 35) or by RF (36, 37) to receive or transmit information, can be a cable decoder box, a satellite decoder box, a telephone company decoder box, a television set, a computer, or a modem.

The wireless RF transmitting circuitry 36 and receiving circuitry 37 can be constructed and arranged to receive RF data from a long range transmitting device such as a paging network, a FM/SCA, a cellular phone, digital communication systems such as PCS, PDM, CDM or other RF transmitting device.

If desired, the annunciator 10 can be constructed and arranged to exchange information with a modem, such as a wired modem or a wireless modem and the intelligence for operating the modem can be in the annunciator 10. See U.S. Pat. No. 5,537,463 to Escobosa and Darbee.

The memory, RAM/ROM 40, of the annunciator 10 can include a buffer memory capable of storing information for being displayed under command from a realtime clock in the annunciator 10 and the annunciator 10 can include software and or hardware for querying the host device for date/time information.

The visual display 14 can be bistable, thereby requiring no refresh buffer and requiring no power to maintain an image on the visual display 14.

The information received from the host device can be in compressed form, can be in the form of drawing commands, such that the software includes instructions for executing the drawing commands by drawing an image on the visual display 14 and/or can be a subset of an electronic program guide for display on the visual display 14 of the annunciator 10.

The software for detecting a low-battery condition can include instructions for displaying an advertisement to replace the batteries with a specific brand of battery.

If desired, back-lighting can be provide for illuminating the visual display 14. See U.S. Pat. No. 5,568,367 to Park.

Also, if desired, the annunciator 10 can include circuitry 48, 50 for producing sound.

Further, the annunciator 10 can include a reader 52 and associated circuitry for reading the magnetic stripe on a credit card or for reading or interfacing with a smart card containing a computer chip. See U.S. Pat. No. 5,603,078 to Henderson et al. or U.S. Pat. No. 5,532,689 to Bueno.

The motion detect circuit 54 can be used to place the annunciator 10 in a given state when it is picked up by a user.

The operating software for the annunciator 10 can be programmed to cycle a buffer memory in the ROM/RAM 40 to display on the visual display 14 multiple categories of information.

The IR or optical receiving circuit 34 can be constructed to receive light signals from a TV screen (VEIL technology) or other form of flashing from the TV screen using visible light (TIMEX technology).

The annunciator 10 can including pointing device circuitry for moving a cursor on the visual display 14 or a host display. See U.S. Ser. No. 08/605,546 for: SYSTEM FOR PROVIDING WIRELESS POINTER CONTROL.

The visual display 14 can include a touch-sensitive display screen or touch sensitive pads/keys on the annunciator 10. See Goldstein U.S. Pat. No. 5,410,326.

An important feature of the annunciator 10 disclosed herein is its ability to keep an advertisement on the display 10 and in front of a user. An ancillary feature is the ability of the annunciator 10 not only to display the advertisement, but also to have an input, such as certain keys on the keyboard for enabling a user to respond to a displayed advertising offer via the wireless, IR or Rf communications link using the certain keys as described above and set forth in FIG. 6.

The received, and perhaps displayed, information can comprise: advertising formatted the same way as a banner on a page on the world wide web; a "trailer" from an advertisement appearing on a host device, thus giving the user more time to respond to an offer in the advertisement; games which can be played on the annunciator 10; codes for upgrading the annunciator 10; instructions for setting up the annunciator 10; a user guide and/or context-sensitive help for display on the visual display 14 of the annunciator 10; and, executable code to be run on the annunciator 10.

From the foregoing description, it will be apparent that the annunciator 10 with advertising display of the present invention has a number of advantages, some of which have been described above and others of which are inherent in the invention. Also it will be understood that modifications can be made to the annunciator described above without departing from the teachings of the present invention. Accordingly, the scope of the invention is only to be limited as necessitated by the accompanying claims.

We claim:

1. An information presentation device for visually presenting information including a liquid crystal, bi-stable, visual display requiring no refresh-buffer and requiring no power to maintain an image on said display, wireless means for receiving, from a host device, data including selected information to be displayed, a realtime dock, a buffer memory, said selected information including advertising and television program guide information and said data being stored in said buffer memory for being displayed under command of said realtime clock, maintaining means for maintaining said selected information displayed on said visual display of said information presentation device and means including liquid crystal materials for maintaining said selected information on said display even when said information presentation device is in a quiescent state or turned off.

2. The information presentation device according to claim 1, wherein said wireless means for receiving data is constructed and arranged to receive RF data from a transmitting device forming part of one of (a) a paging network, (b) a FM/SCA, (c) a cellular phone network, (d) a PCS, or (e) receiving circuitry associated with a television set for receiving a television signal.

3. The information presentation device of claim 1 including means for detecting a low-battery condition, and means for displaying an advertisement to replace the batteries with a specific brand of battery.

4. The information presentation device of claim 1 including means for interfacing with a Smart Card containing a computer chip.

5. The information presentation device of claim 1 wherein said advertising is formatted the same way as a banner on a page on a multi-user global computer information network.

6. The information presentation device of claim 1 wherein some of the information comprises codes for upgrading said information presentation device.

7. The information presentation device of claim 1 wherein said selected information includes at least one of news, weather, temperature, sports, traffic reports, or financial reports.

8. The information presentation device of claim 1 wherein said information presentation device is configured to look like and act as a beverage coaster.

9. The information presentation device of claim 1 including hook and loop material fixed to a surface of said device and mating hook and loop material fixed to a surface on which said device is to be mounted.

10. The information presentation device of claim 1 including mounting means selected from the group comprising: a magnet for attaching said device to a metal surface; a suction cup for attaching said device to an impervious surface; an adhesive for attaching said device to a surface; a pin for attaching said device to a suitable piece of material, such as clothing; and/or a chain, a string, a ribbon, or other flexible means for attaching said device to another object or to a person.

* * * * *